United States Patent
Suzuki (10) Patent No.: US 7,156,138 B2
(45) Date of Patent: Jan. 2, 2007

(54) PNEUMATIC TIRE WITH BELT PLY HAVING COMPOSITE TOPPING RUBBER LAYER

(75) Inventor: Kazuya Suzuki, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 80 days.

(21) Appl. No.: 11/050,720

(22) Filed: Feb. 7, 2005

(65) Prior Publication Data
US 2005/0205190 A1    Sep. 22, 2005

(30) Foreign Application Priority Data
Mar. 22, 2004    (JP) .............................. 2004-083204

(51) Int. Cl.
B60C 9/18    (2006.01)
B60C 9/20    (2006.01)
(52) U.S. Cl. ...................... 152/526; 152/537
(58) Field of Classification Search .......... 152/537, 152/564, 535, 536
See application file for complete search history.

(56) References Cited

U.S. PATENT DOCUMENTS 5,379,818 A * 1/1995 Suzuki et al.
6,843,294 B1 * 1/2005 Togo .......................... 152/527

FOREIGN PATENT DOCUMENTS

| JP | 08072160 A | * | 3/1996 |
| JP | 2001121622 | * | 5/2001 |
| JP | 2002326289 | * | 12/2002 |
| JP | 2003034109 A | * | 2/2003 |

OTHER PUBLICATIONS

Patent Abstract of Japan, vol. 2003, No. 12, Dec. 5, 2003: JP 2003-226113 A.

* cited by examiner

*Primary Examiner*—Justin Fischer
(74) *Attorney, Agent, or Firm*—Birch, Stewart, Kolasch, and Birch, LLP (57) ABSTRACT

A pneumatic tire includes a carcass extending between bead portions through a tread portion and sidewall portions and a belt disposed radially outside the carcass in the tread portion, the belt constituting at least one belt ply made of parallel cords embedded in a composite topping rubber layer, the composite topping rubber layer formed from at least two kinds of topping rubbers having different complex elastic moduli, and the topping rubbers alternately disposed in a a circumferential direction of the tire.

13 Claims, 6 Drawing Sheets

PNEUMATIC TIRE WITH BELT PLY HAVING COMPOSITE TOPPING RUBBER LAYER

BACKGROUND OF THE INVENTION

1. Field of the Invention

The present invention relates to a pneumatic tire in which uniformity can be enhanced.

2. Description of the Related Art

In recent years, higher uniformity is required for tires. Especially, a tractive force variation ("TFV", hereinafter) that is a variation component of force in a longitudinal direction at the time of rotation, and a radial force variation ("RFV", hereinafter) that is a variation component of force in a radial direction of the tire cause vibration and noise at the time of running. Therefore, it is desired to reduce such force variations as small as possible.

Conventionally, in order to enhance the uniformity of a tire, there is proposed a pitch variation method for dispersing pitch arrangement in a tread pattern of the tire. There is also proposed a method for dispersing joint portions of tire constituent members such as a carcass ply and a belt ply so that the joint portions are not overlapped.

SUMMARY OF THE INVENTION

It is an object of the present invention to enhance the uniformity from a different view point from those of conventional techniques. In accordance with the present invention a pneumatic tire comprises:

a carcass extending between bead portions through a tread portion and sidewall portions; and a belt disposed radially outside the carcass in the tread portion, said belt comprising at least one belt ply made of parallel cords embedded in a composite topping rubber layer, said composite topping rubber layer formed at least two kinds of topping rubbers having different complex elastic moduli and said topping rubbers alternately disposed in a circumferential direction of the tire.

Such a belt ply having the composite topping rubber layer disperses rigidity of the belt ply in the circumferential direction of the tire, and enhances the uniformity, especially the TFV at the time of high speed running.

DETAILED DESCRIPTION OF THE PREFERRED EMBODIMENTS

Figure 1:
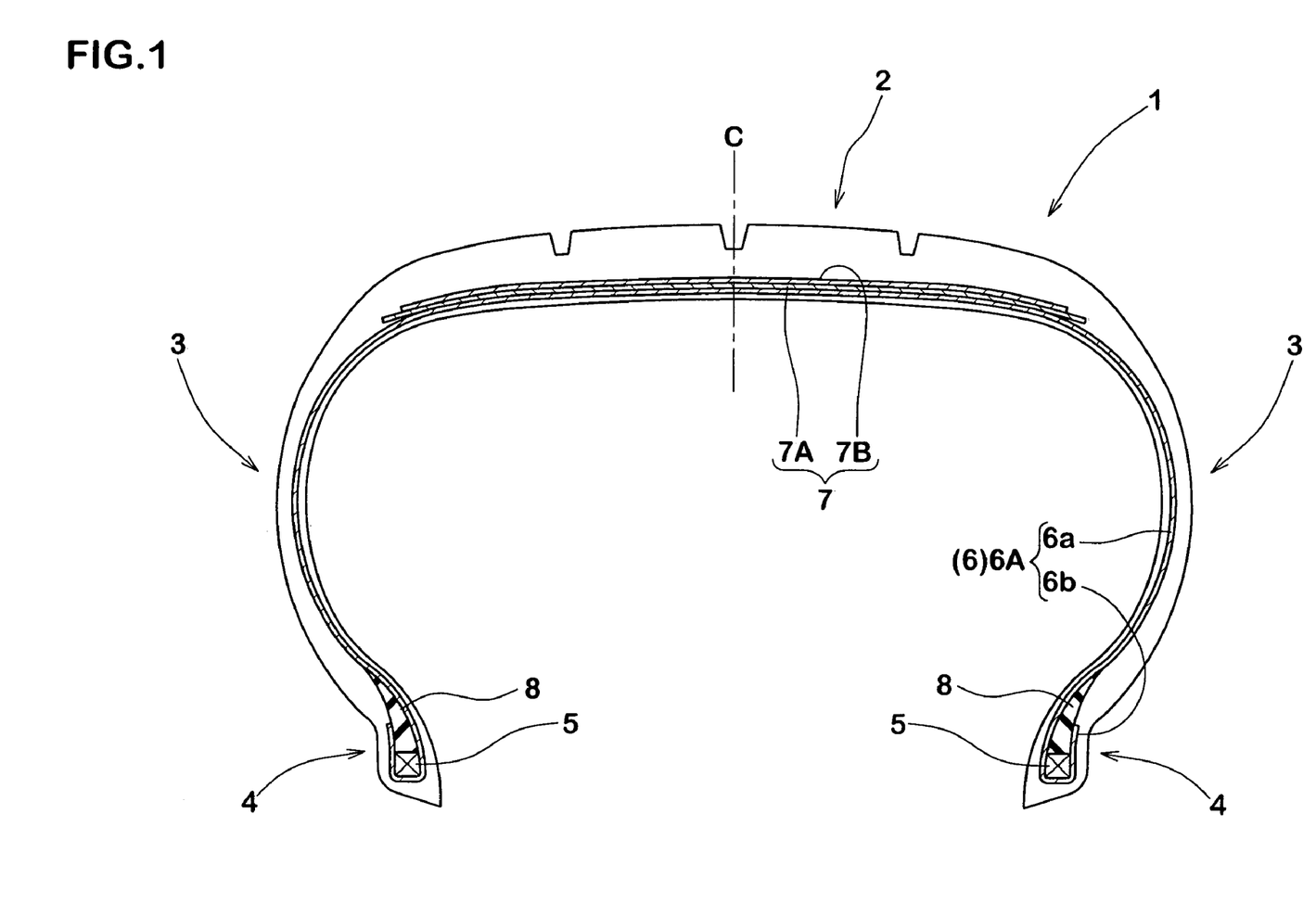
FIG. 1 is a sectional view of a pneumatic tire showing an embodiment of the present invention.

In the drawings, a pneumatic tire 1 according to the present invention comprises a tread portion 2, a pair of sidewall portions 3, a pair of bead portions 4, a carcass 6 extending between the bead portions 4 through the tread portion 2 and sidewall portions 3, a belt 7 disposed radially outside the carcass 6 in the tread portion 2. The tire 1 in this embodiment is a tubeless radial tire for a passenger car.

The carcass 6 comprises at least one ply, in this embodiment only one ply 6A, of radially arranged carcass cords extending between the bead portions 4 through the tread portion 2 and sidewall portions 3 and turned up around the bead cores 5 from the axially inside to outside of the tire to be secured thereto and to form a pair of turnup portions 6b and a main portion 6a therebetween. The cords are arranged at a certain angle in the range of from 80 to 90 degrees with respect to the tire equator C. For the carcass cords, organic fiber cords, e.g. polyester, nylon, rayon, aramid and the like are preferably used. However, steel cords can also be used.

Between the turnup portion 6b and main portion 6a in each bead portions 4, a bead apex 8 is disposed and extends taperingly radially outwards from the bead core 5. The bead apex 8 is made of a hard rubber compound preferably having a JIS-A hardness of 80 to 98 degrees.

Figure 2:
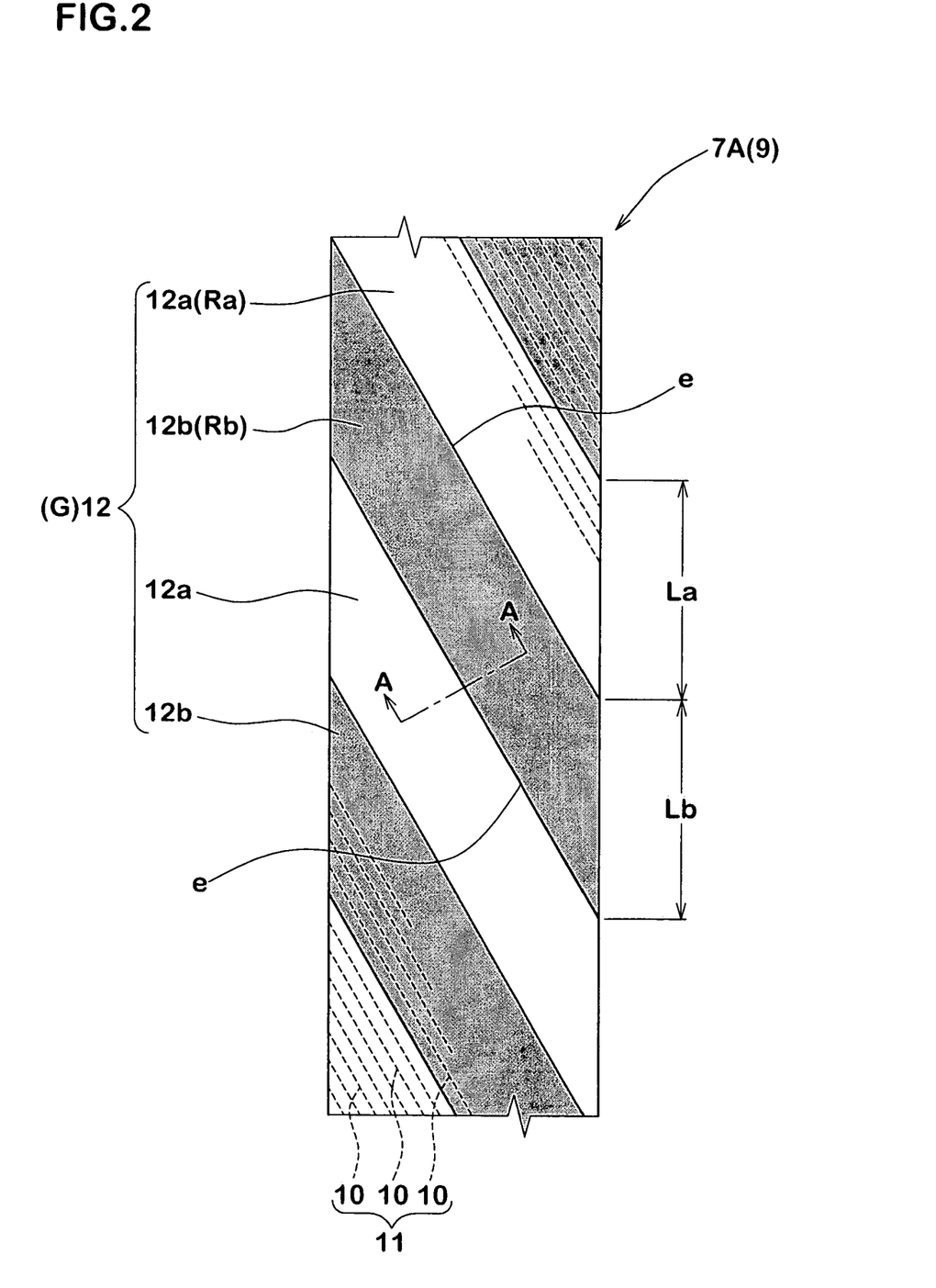
FIG. 2 is a developed view of one belt ply.

The belt 7 comprises at least one belt ply, preferably two belt plies 7A and 7B as shown in FIG. 1. FIG. 2 is a developed view of the one belt ply 7A. The belt ply 7A comprises a plurality of parallel belt cords 11 inclined with respect to a circumferential direction of the tire, and a topping rubber layer G in which the belt cords 11 are embedded.

In this embodiment, steel cords are employed as the belt cords 10. As the steel cords, it is possible to use various cords, such as solid wires, stranded wires, or a plurality of wires bundle in parallel to one another. In addition to the steel cords, it is possible to employ organic fiber cords having high elasticity such as aromatic polyamide, rayon and the like.

Figure 4:
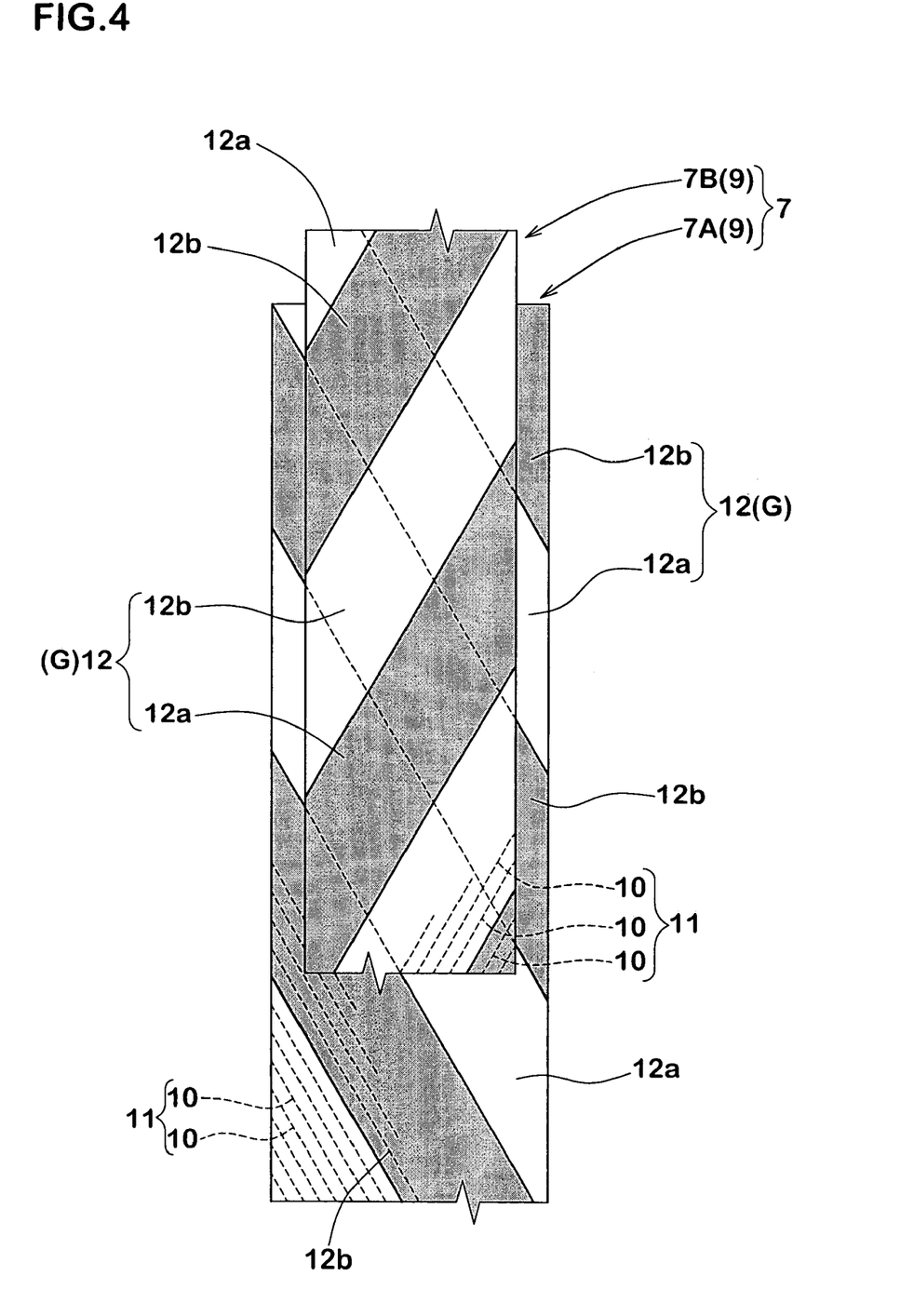
FIG. 4 is a developed view of a belt.

The belt cords 10 are inclined with respect to the tire equator C through about 10 to 35°. As shown in FIG. 4, the belt plies 7A and 7B are arranged in a direction in which the cords intersect with each other. The belt ply 7A arranged radially inside of the tire is wider than the belt ply 7B, and widthwise centers of both the plies 7A and 7B are substantially aligned to each other.

At least one of the belt plies 7A and 7B of the belt 7 comprises a belt ply 9 having a composite topping rubber layer 12. In this embodiment, each of the belt plies 7A and 7B comprises the belt ply 9 having the layer 12.

As shown in FIG. 2, the composite topping rubber layer 12 formed at least two kinds of topping rubbers having different complex elastic moduli and alternately arranged in the circumferential direction of the tire. The composite layer 12 of this embodiment comprises a first topping portion 12a made of a first topping rubber Ra and a second topping portion 12b made of a second topping rubber Rb having greater complex elastic modulus than that of the first topping rubber Ra. The first topping portion 12a and the second topping portion 12b are alternately arranged in the circumferential direction of the tire. That is, in this embodiment, there are two kinds of topping rubbers.

Each of the first topping portion 12a and the second topping portion 12b are formed into substantially parallelogram having a pair of parallel sides e, e extending along the cords 11. The first and second topping portions 12a and 12b form the topping rubber layer 12 which continuously extends in the circumferential direction of the tire through a joint at which the sides e and e thereof are jointed to each other.

Figure 3:
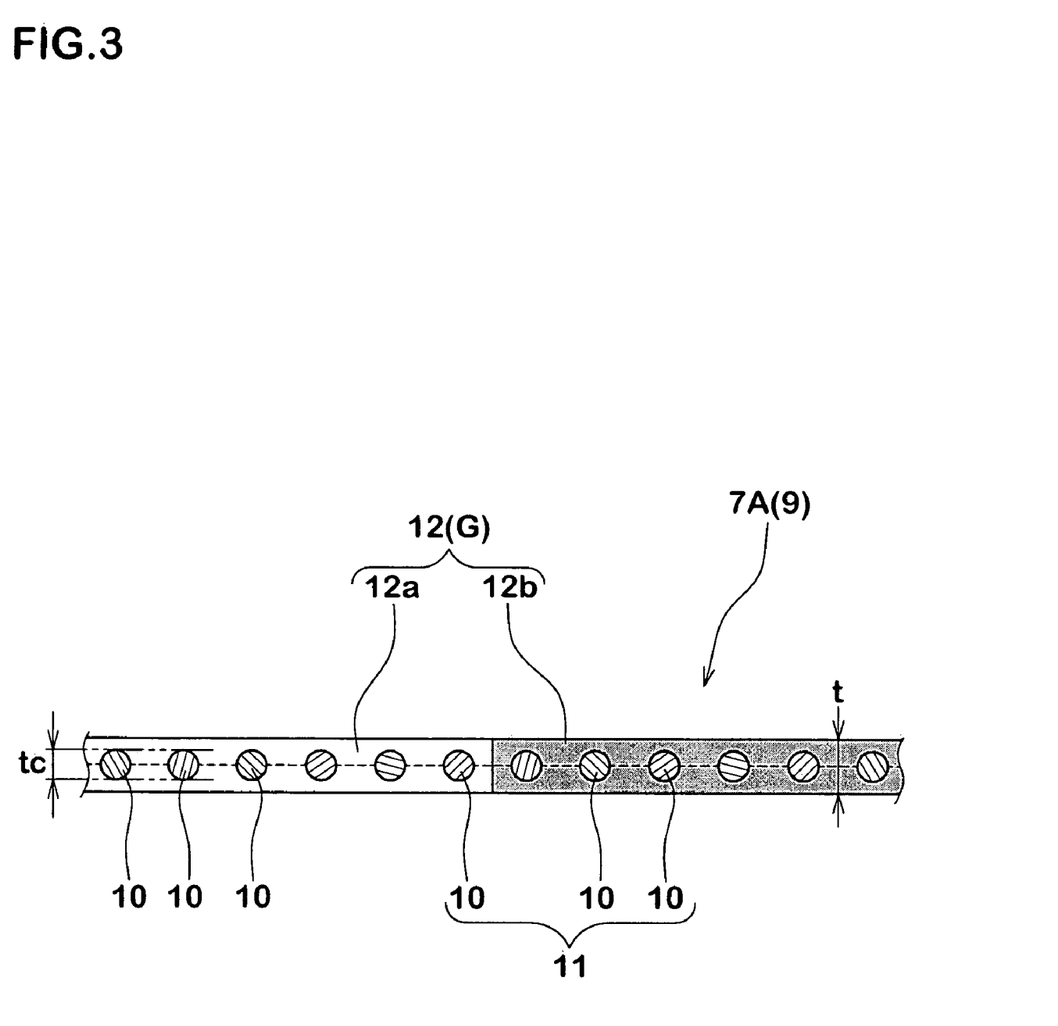
FIG. 3 is a sectional view taken on line A—A in FIG. 2.

As is apparent from FIG. 3, the topping rubber layer 12 of this embodiment has an enough thickness to completely cover the belt cords 11. In other words, a thickness t of the topping rubber layer 12 is greater than an outer diameter tc of the belt cord 10. However, the manner in which the topping rubber layer 12 covers the belt cords 11 is not limited to that shown in the drawing.

The thickness t of the topping rubber layer 12 is preferably about 1.0 to 2.0 times the outer diameter tc of the belt cord 10. This thickness t may be constant or varied. The cross sections of the belt plies 7A and 7B are usually finished to the shape as shown in FIG. 3 by crimping thin rubber sheets on both side surfaces of the belt cords 11. In this embodiment, the first topping portion 12a and the second topping portion 12b constitute the entire thickness as measured from the upper surface to the lower surface of the belt ply 9.

In the composite topping rubber layer 12, rubber portions of different rigidities appear alternately in the circumferential direction of the tire. The belt ply 9 having the composite rubber layer 12 provides rigidity variation in which a high rigidity portion and a low rigidity portion are dispersed in the circumferential direction. This reduces TFV and RFV and enhances the uniformity as in a later-described embodiment. Generally, the belt ply includes at least one joint portion that is a joint at which both ends of the ply are jointed to each other in the molding process. This joint portion provides a primary vibration peak at the time of high speed rotation. However, if the first and second topping portions 12a and 12b having different rigidities are jointed each other and many joint portions are formed, the vibration peak is dispersed and the uniformity is enhanced.

In the belt ply, if the elastic modulus of the topping rubber is uniformly increased, the rigidity of the belt 7 can be increased but the riding comfort is deteriorated and noise is increased. Therefore, if the two kinds of rubbers having different elastic moduli are included in the topping rubber layer, the rigidity of the belt 7 can be enhanced without deteriorating the riding comfort and increasing noise. The hoop effect of the belt 7 is suitable for suppressing the variation of the FV component, and since the rigidity distribution of the belt ply is varied, there is an effect that the tire noise is reduced and the peak of a particular order component is reduced.

As shown in FIG. 4, according to this embodiment, the two belt plies 7A and 7B are radially arranged in the direction in which the belt cords 11 intersect with each other. Therefore, the two belt plies 9 and 9 having composite topping rubber layers 12 are overlapped in the direction in which the substantially parallelogram topping rubber portions 12a intersect with each other. With this, a new binding force is generated by a cross structure comprising the topping portions 12a and 12b, especially the second rubber Rb having greater complex elastic modulus. Thus, the rigidity as the belt 7 is further enhanced, and the vibration at the time of high speed running can be suppressed.

As shown in FIG. 2, the belt ply 9 of this embodiment is formed such that a length La of the first topping portion 12a in the circumferential direction of the tire measured at a side edge thereof in the widthwise direction of the ply, and a length Lb of the second topping portion 12b in the circumferential direction of the tire are substantially equal to each other. The first and second topping portions 12a and 12b are formed by parallelograms having the same shapes. According to such a topping rubber layer 12, since the distribution of rigidity is uniform, the uniformity can further be enhanced.

The lengths La and Lb can be set in accordance with required performance. For example, when it is necessary to further enhance the rigidity of the belt ply 9, it is preferable that the length Lb of the second topping portion 12b is longer than the length La of the first topping portion 12a. When it is necessary to moderate the rigidity of the belt ply 9 on the other hand, the length Lb of the second topping portion 12b should be shorter than the length La of the first topping portion 12a. In any case, it is preferable that the lengths La and Lb are maintained constantly in one belt ply.

In each belt ply 9 having the composite rubber layer 12, it is preferable that the number of first topping portion 12a and second topping portion 12b is 3 or more and 20 or less, more preferably 5 or more and 15 or less, and more preferably 5 or more and 10 or less. If the number is less than 3, the distribution degree of rigidity is small, and the enhancing effect of the uniformity is small. In some cases, there is an adverse possibility that the uniformity component becomes great. If the number exceeds 20 on the other hand, there is a tendency that the number of joint processes for jointing the first and second topping portions 12a and 12b is increased and the productivity is deteriorated. It is preferable that the length of the belt ply 9 is substantially an integral multiple of a sum (La+Lb) of the lengths La and Lb of the first and second topping portions 12a and 12b. The reason of the term "substantially" is that the overlapped portion of both ends of the plies is taken into account.

Although not particularly limited, it is preferable that a ratio ($E^*2/E^*1$) of complex elastic modulus $E^*1$ of the first topping rubber Ra and complex elastic modulus $E^*2$ of the second topping rubber Rb of the belt ply 9 is 1.15 or higher. If the ratio ($E^*2/E^*1$) is less than 1.15, the rigidity can not be dispersed effectively in the topping grubber 12, and there is a tendency that the uniformity can not be enhanced. It is more preferable that the ratio ($E^*2/E^*1$) is 1.2 or higher. On the other hand, if the ratio ($E^*2/E^*1$) is excessively high, the rigidity difference between the first and second rubber Ra and Rb becomes excessively large, stress concentration is prone to be generated in the joint interface of both the rubbers, and there is a tendency that the durability is deteriorated. Due to such reasons, it is preferable that the ratio ($E^*2/E^*1$) is not more than 1.50 and more preferably not more than 1.40. More specifically, the complex elastic modulus of the first topping rubber Ra is preferably about from 5.0 to 8.0 MPa.

In this specification, the complex elastic modulus is a value obtained by measuring a measurement sample using a viscoelasticity spectrometer "VES F-3 type" made by Iwamoto Seisakusho under the following conditions:

Measuring temperature: 70° C.

Frequency: 10 Hz

Initial extension distortion: 10%

Half amplitude: 1%

Figure 5:
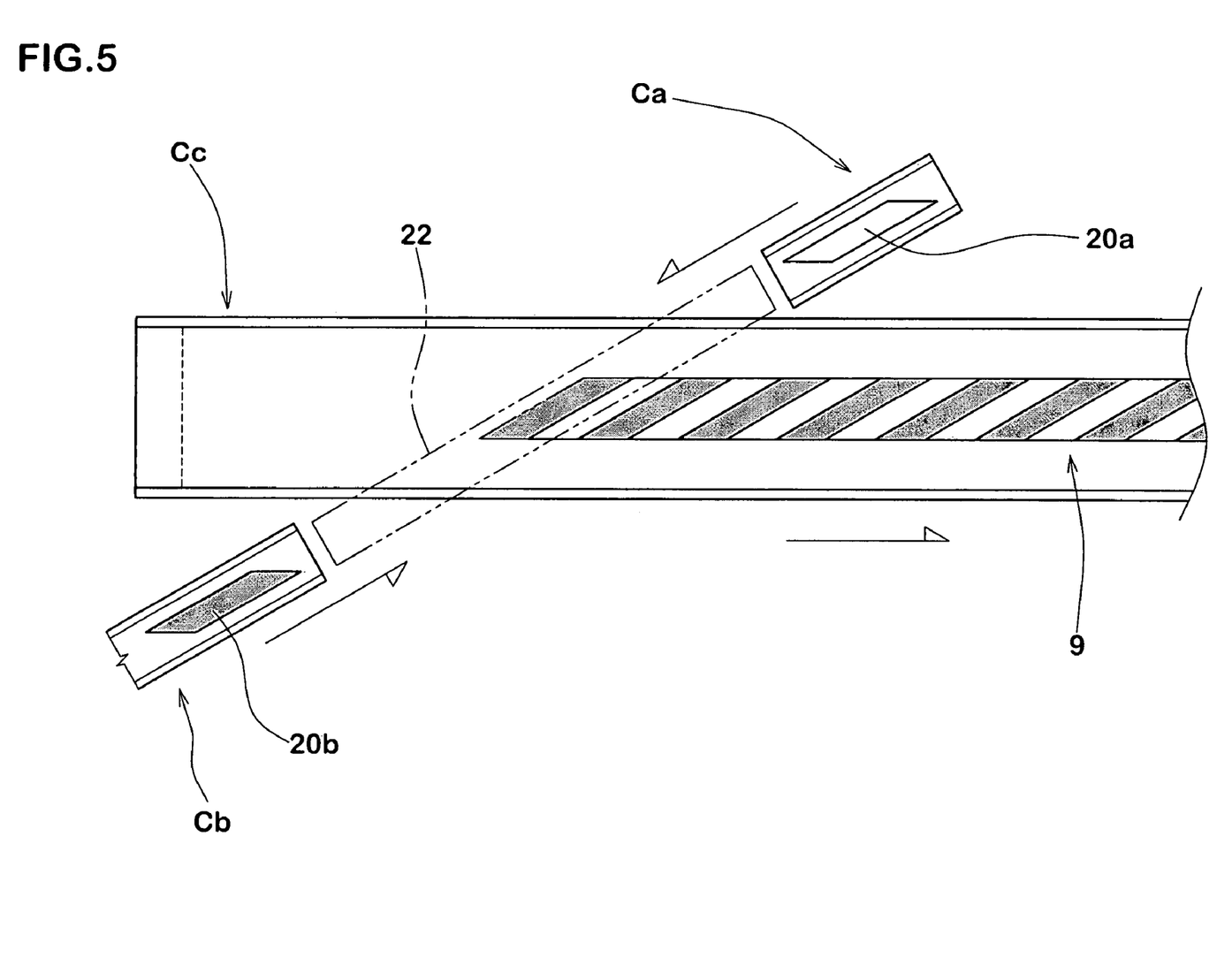
FIG. 5 is a plan view showing one example of a producing process of a belt ply.

The belt ply 9 having the composite topping rubber layer 12 can be produced using equipment or process as shown in FIG. 5. In FIG. 5 shows a central conveyor Cc, a first ply piece supply conveyor Ca disposed on one side of the central conveyor Cc, and a second ply piece supply conveyor Cb disposed on the other side. The first ply piece supply conveyor Ca successively supplies, toward the central conveyor Cc, first topping rubber ply pieces 20a obtained by bias-cutting a base ply (not shown) coated with the first rubber Ra. The second ply piece supply conveyor Cb successively supplies, toward the central conveyor Cc, second topping rubber ply pieces 20b obtained by bias-cutting a base ply (not shown) coated with the second rubber Rb. In the central conveyor Cc, the first and second ply pieces 20a and 20b which are alternately supplied are pressed and jointed, thereby continuously forming the long belt plies 9 having the composite topping rubbers. This is one example of the producing method, and the method is not limited to this only.

Figure 6:
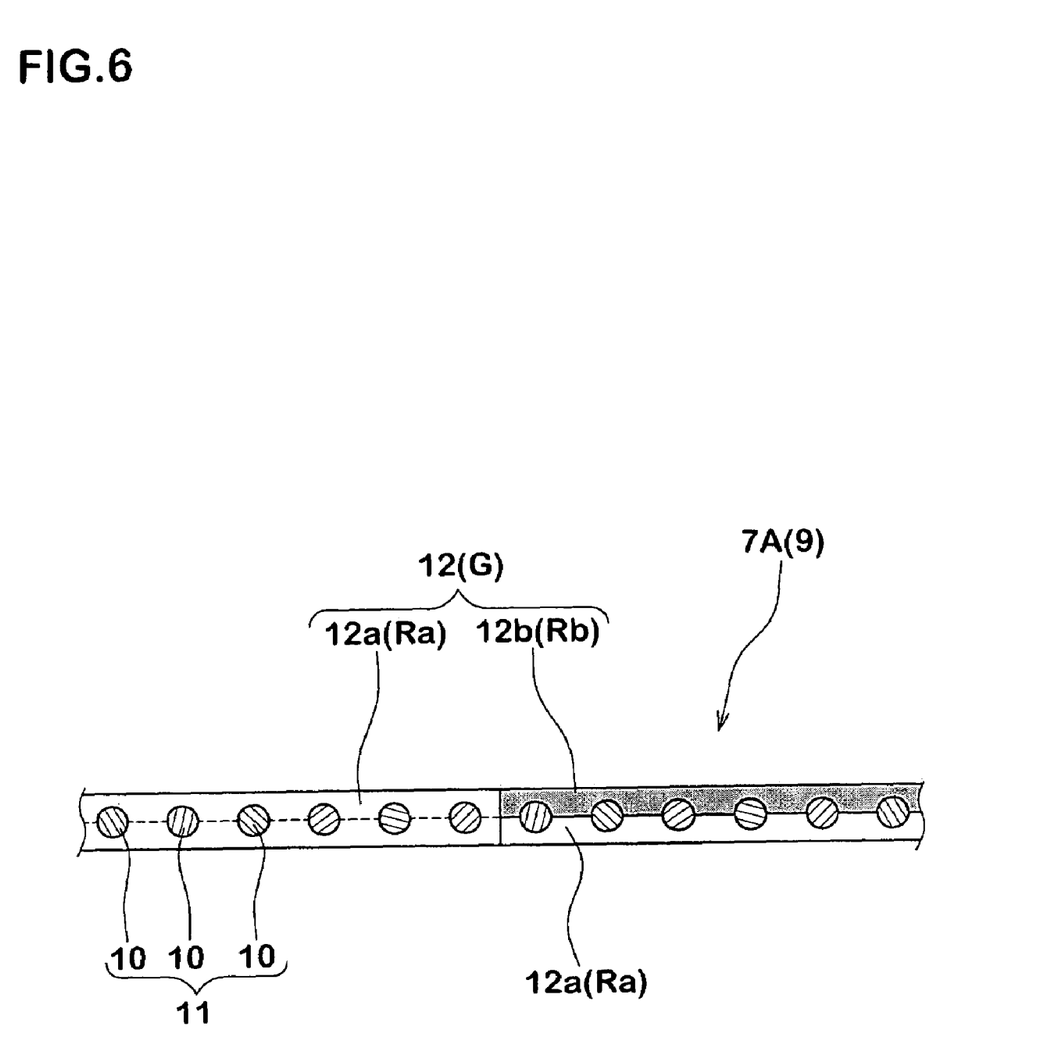
FIG. 6 corresponds to a sectional view taken on line A—A in FIG. 2 showing another embodiment of a belt ply having a composite topping rubber layer.

FIG. 6 shows another embodiment of the present invention. FIG. 6 corresponds to a sectional view taken on line A—A in FIG. 2. In the topping rubber layer 12 of this embodiment, only one surface of the belt cords 11 is made of two kinds of topping rubbers Ra and Rb, and the other surface is made of one kind of topping rubber (e.g., first rubber Ra). In this manner, the present invention can be carried out in various modes.

Although the embodiments of the present invention have been described above, the invention is not limited to these embodiments. For example, the topping rubber may be formed of three or more kinds of topping rubbers having different complex elastic moduli. In this case, three kinds of rubber materials are alternately arranged in the same order in the circumferential direction of the tire.

EXAMPLES

To confirm the effect of the present invention, pneumatic radial tires (tire size: 215/60R16 95H) were prototyped based on the specification shown in Table 1, and uniformity was tested. In the measurement of uniformity, TFV and RFV were measured in accordance with uniformity testing conditions of JASO C607:2000 using a uniformity tester. The evaluation speed is 120 km/h. This is because that TFV which is prone to have a problem as the running speed is increased is evaluated. A result is expressed using the average value (N) of twenty tires. The smaller the numeric value, the better the result is. Table 1 shows the test result and the like.

As a result of the test, it could be confirmed that the example tire of the present invention has smaller TFV and RFV and more excellent uniformity as compared with the conventional example.

What is claimed is:

1. A pneumatic tire comprising:
   a carcass extending between bead portions through a tread portion and sidewall portions; and
   a belt disposed radially outside the carcass in the tread portion, said belt comprising at least one belt ply made of parallel cords embedded in a composite topping rubber layer,
   the cords of the belt ply being inclined at an angle of from 10 to 35 degrees with respect to the tire equator,
   said composite topping rubber layer formed at least two kinds of topping rubbers including a first topping portion made of a first topping rubber and
   a second topping portion made of a second topping rubber having greater complex elastic modulus than that of the first topping rubber,
   each of the first topping portion and the second topping portion being formed substantially into a parallelogram having a pair of parallel sides extending along the cords and a pair of parallel edges each forming a part of the axially outer edge of the belt ply, and said first and second topping rubbers alternately disposed in a circumferential direction of the tire.

2. The pneumatic tire according to claim 1, wherein
   the belt comprises at least two belt plies arranged in a direction in which the cords intersect with each other, and
   each of the belt plies has the composite topping rubber layer.

3. The pneumatic tire according to claim 1, wherein
   a length of the first topping portion in the circumferential direction of the tire substantially equals to a length of the second topping portion in the circumferential direction of the tire.

TABLE 1

| | | Conventional Example | Example 1 | Example 2 | Example 3 | Example 4 | Example 5 | Example 6 | Example 7 | Example 8 | Example 9 |
|---|---|---|---|---|---|---|---|---|---|---|---|
| First topping portion | Complex elastic modulus $E^*a$ [MPa] | 6.5 | 6.5 | 6.5 | 6.5 | 6.5 | 6.5 | 6.5 | 6.5 | 6.5 | 6.5 |
| | The number of pieces (per one) [piece] | — | 10 | 7 | 3 | 2 | 12 | 1 | 10 | 10 | 10 |
| | Length La [mm] | — | 100 | 143 | 333 | 500 | 83 | 1000 | 100 | 120 | 80 |
| Second topping portion | Complex elastic modulus $E^*b$ [MPa] | — | 7.8 | 7.8 | 7.8 | 7.8 | 7.8 | 7.8 | 7.2 | 7.8 | 7.8 |
| | The number of pieces (per one) [piece] | — | 10 | 7 | 3 | 2 | 12 | 1 | 10 | 10 | 10 |
| | Length Lb [mm] | — | 100 | 143 | 333 | 500 | 83 | 1000 | 100 | 80 | 120 |
| Test result | TFV Primary [N] | 86 | 80 | 78 | 81 | 80 | 82 | 80 | 78 | 78 | 76 |
| | Secondary [N] | 85 | 64 | 68 | 73 | 72 | 80 | 88 | 81 | 66 | 62 |
| | Tertiary [N] | 45 | 43 | 41 | 41 | 40 | 43 | 48 | 43 | 41 | 42 |
| | RFV Primary [N] | 82 | 80 | 79 | 77 | 81 | 81 | 77 | 81 | 80 | 79 |
| $(E^*b/E^*a)$ | | — | 1.2 | 1.2 | 1.2 | 1.2 | 1.2 | 1.2 | 1.1 | 1.2 | 1.2 |

4. The pneumatic tire according to claim 1, wherein each belt ply having the composite topping rubber layer includes from 3 to 20 first topping portions and second topping portions.

5. The pneumatic tire according to claim 1, wherein a ratio (E*2/E*1) of complex elastic modulus E*1 of the first topping rubber and complex elastic modulus E*2 of the second topping rubber is from 1.15 to 1.50.

6. The pneumatic tire according to claim 1, wherein a length of the first topping portion in the circumferential direction of the tire is larger than that of the second topping portion.

7. The pneumatic tire according to claim 1, wherein a length of the first topping portion in the circumferential direction of the tire is smaller than that of the second topping portion.

8. The pneumatic tire according to claim 1, wherein the belt ply comprises radially one surface made of the first and the second topping rubbers and the opposite surface made of one kind of topping rubber.

9. The pneumatic tire according to claim 1, wherein all of the cords of the belt ply are made of the same material.

10. The pneumatic tire according to claim 1, wherein all of the cords of the belt ply are made of steel cords.

11. The pneumatic tire according to claim 1, wherein all of the cords of the belt ply are made of organic fiber cords.

12. The pneumatic tire according to claim 1, wherein the parallel edge has a length in the range of from 80 to 500 mm.

13. A pneumatic tire comprising:
a carcass extending between bead portions through a tread portion and sidewall portions; and
a belt disposed radially outside the carcass in the tread portion, said belt comprising at least one belt ply made of parallel cords embedded in a composite topping rubber layer,
the cords of the belt ply being inclined at an angle of from 10 to 35 degrees with respect to the tire equator,
said composite topping rubber layer formed at least two kinds of topping rubbers including a first topping portion made of a first topping rubber and
a second topping portion made of a second topping rubber having greater complex elastic modulus than that of the first topping rubber,
said first and second topping rubbers alternately disposed in a circumferential direction of the tire, and
a ratio (E*2/E*1) of complex elastic modulus E*1 of the first topping rubber and complex elastic modulus E*2 of the second topping rubber being from 1.15 to 1.50.

* * * * *